United States Patent [19]
Kuwa

[11] Patent Number: 5,325,514
[45] Date of Patent: Jun. 28, 1994

[54] PROGRAM EXECUTIVE TIMING APPARATUS FOR ENSURING THAT STATE CHANGES OF A REFERENCE CLOCK SIGNAL USED TO TIME THE EXECUTION OF THE PROGRAM ARE NOT MISSED

[75] Inventor: Shunji Kuwa, Neyagawa, Japan

[73] Assignee: Omron Corporation, Kyoto, Japan

[21] Appl. No.: 566,096

[22] Filed: Aug. 13, 1990

[30] Foreign Application Priority Data

Sep. 6, 1989 [JP] Japan ................................. 1-231095
Sep. 6, 1989 [JP] Japan ................................. 1-231096

[51] Int. Cl.⁵ .............................................. G06F 1/14
[52] U.S. Cl. .................................. 395/550; 395/650; 395/700; 364/DIG. 1; 364/271.3
[58] Field of Search ............. 364/DIG. 1, DIG. 2, 364/143; 371/16.1, 16.3, 19, 47.1, 61, 62; 395/550, 575, 650, 700

[56] References Cited

U.S. PATENT DOCUMENTS

| | | | |
|---|---|---|---|
| 3,908,117 | 9/1975 | Naruse et al. | 371/18 |
| 3,996,567 | 12/1976 | Ausan | 395/550 |
| 4,266,281 | 5/1981 | Struger et al. | 395/550 |
| 4,321,687 | 3/1982 | Parsons et al. | 395/550 |
| 4,405,982 | 9/1983 | Ruhnau et al. | 371/62 |
| 4,472,789 | 9/1984 | Sibley | 371/62 |
| 4,722,043 | 1/1988 | Nagamine et al. | 364/147 |
| 4,775,957 | 10/1988 | Yakuwa et al. | 371/62 |
| 4,825,352 | 4/1989 | Ijima et al. | 364/143 |
| 4,965,884 | 10/1990 | Okura et al. | 375/106 |
| 5,012,435 | 4/1991 | Bailey et al. | 371/16.3 |

Primary Examiner—Thomas C. Lee
Assistant Examiner—John C. Loomis
Attorney, Agent, or Firm—Dickstein, Shapiro & Morin

[57] ABSTRACT

A programmable controller has a function for referring to a reference clock signal every cycle time and updating the present value of a count in a user timer upon confirming that the reference clock signal has changed state. An execution time of a user program is measured from the start of execution thereof in each cycle time, and it is determined whether the measured execution time has exceeded a minimum unit time of the reference clock signal, such that the present value of the count in the user timer is updated even if the minimum unit time has been exceeded. As a result, the present value of the user timer count can be updated with certainty even if the user program execution time is so long that the minimum unit time is exceeded.

8 Claims, 15 Drawing Sheets

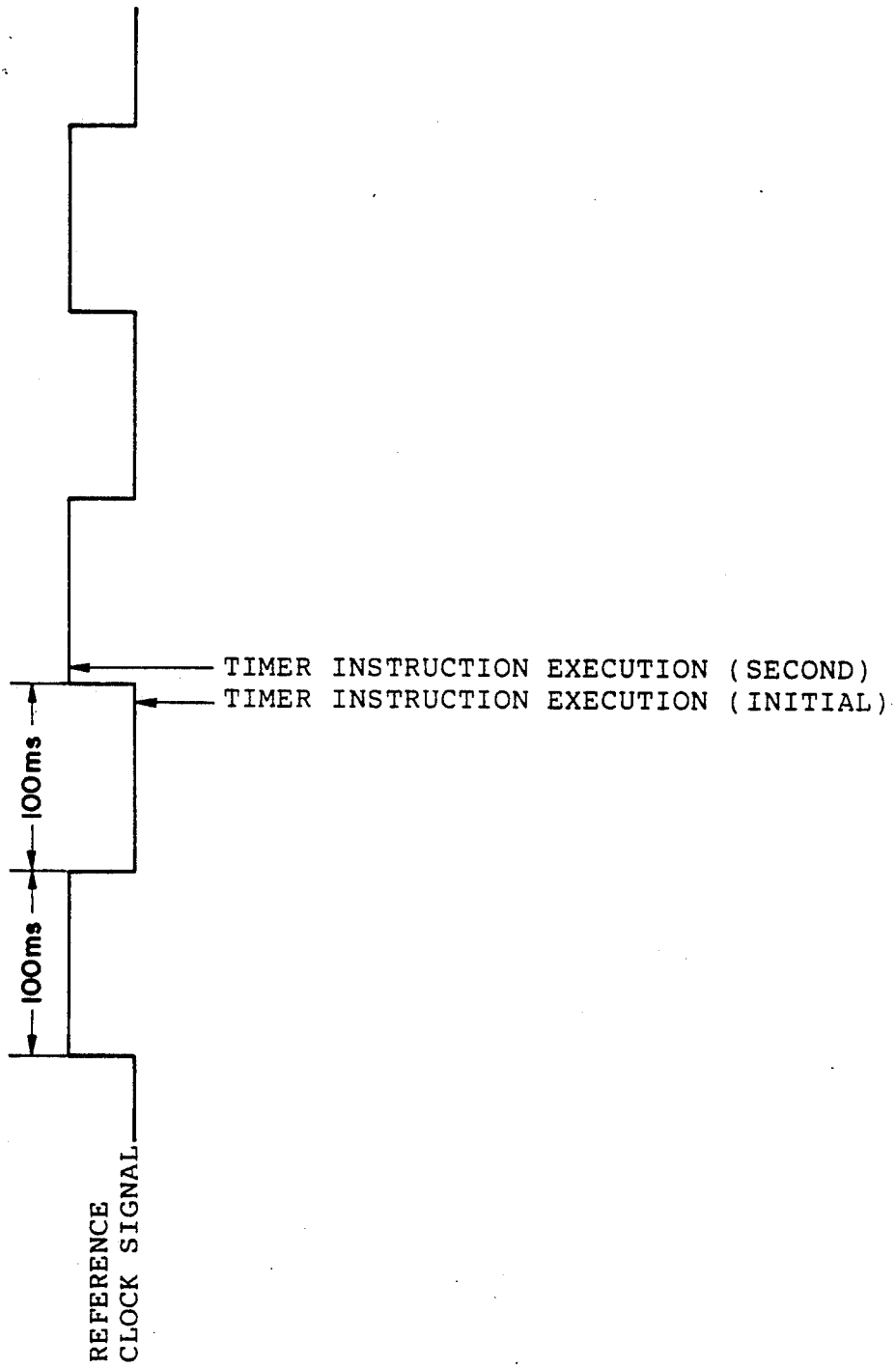

PROGRAM EXECUTIVE TIMING APPARATUS FOR ENSURING THAT STATE CHANGES OF A REFERENCE CLOCK SIGNAL USED TO TIME THE EXECUTION OF THE PROGRAM ARE NOT MISSED

BACKGROUND OF THE INVENTION

1. Field of the Invention

This invention relates to a programmable controller used in sequence control. More particularly, the invention relates to a programmable controller having a user timer (function) employed by the user.

2. Description of the Related Art

A user timer in a programmable controller is realized using a predetermined area (referred to as a "user timer area") in a memory. Specifically, the present value (also referred to as a "counted value") stored in the user timer area is incremented or decremented in order to clock time. (The incrementing or decrementing is also referred to as updating of the present value or updating of the timer). A decision that time has run out is rendered when the present value becomes equal to a predetermined value.

The processing for updating the user timer is executed while referring to a reference clock signal. The reference clock signal is produced by a reference clock generator means incorporated in the programmable controller and, as shown in FIGS. 14 and 15, repeatedly alternates between H and L levels at a fixed period. In FIGS. 14 and 15, the period of the reference clock signal is 200 ms, and the half-period of 100 ms is the minimum unit time for updating the counted value of the timer.

Processing for updating the user timer is executed in the following manner: The state (H level or L level) of the reference clock signal is checked at a predetermined timing. If the state of the signal differs from that which prevailed the last time it was checked, the present value of the user timer is updated. If the state of the reference clock signal is the same as when last checked, a decision is rendered to the effect that updating is unnecessary and therefore the present value of the user timer is not updated.

As will be illustrated later with reference to FIG. 2, the programmable controller repeatedly executes a series of processing operations comprising common processing, user program execution processing and I/O (input/output unit) refresh processing. The time for one cycle of this series of processing operations to be performed is referred to as "cycle time". A timer instruction for starting a predetermined user timer (and for updating the timer in certain cases) is contained in the user program.

The timing at which the state of the reference clock signal is checked in order to update the timer is of two kinds, though the timing differs depending upon the type of programmable controller. Specifically, the state of the reference clock signal is checked 1) when the timer instruction contained in the user program is executed and/or 2) when common processing is executed in each cycle time.

The following problem arises with a programmable controller employing the timer update timing of type 1):

As shown in FIG. 14, if the time interval between the moment at which the immediately preceding timer instruction is executed and the moment at which the current identical timer instruction is executed exceeds the abovementioned minimum unit time (100 ms), the state of the reference clock signal when checked the immediately preceding time will be the same as that when checked at the present time (the state of the signal will be the H level at both times in the illustrated example). Consequently, the timer will not be updated even though a time in excess of the minimum unit time has elapsed. Accordingly, the timekeeping performed by the timer will not be executed correctly.

The following problem arises with a programmable controller employing the timer update timing of type 2):

As shown in FIG. 15, if one cycle time (CT) is less than the minimum unit time (100 ms), then timer update will be performed correctly in dependence upon whether or not there is a change in the state of the reference clock signal, as at update timings ②, ③, ④ and ⑥. FIG. 15 is a time chart for a decrementing timer (a preset timer); therefore, the present value is decremented. However, if one cycle time (CT) exceeds the minimum unit time, as it does between the update timings ④ and ⑤, then the state of the reference clock will be the same at the immediately preceding time ④ and at the present time ⑤ (the state will be the H level at both times). As a result, the timer will not be updated (the decremented value will be zero).

The greater the amount of processing in accordance with the user program, the more frequently these problems arise.

Furthermore, the following problem arises owing to the updating methods 1) and 2) mentioned above:

Reference will be had to FIG. 16 in relation to the update timing of method 1). As shown in FIG. 16, if the initial update timing (when the timer is started) occurs immediately before the leading edge of the reference clock signal and the second update timing occurs immediately after this leading edge, 100 ms is measured despite the fact that the actual elapsed time is very small. As a result, a measurement error of nearly 100 ms occurs at the instant the timer is started.

SUMMARY OF THE INVENTION

An object of the present invention is to provide a programmable controller in which updating of the timer can be performed correctly at all times even if processing of the user program requires a long period of time.

Another object of the present invention is to provide a programmable controller in which the occurrence of an error in measurement time at the starting of the timer is prevented so that correct timekeeping can be carried out.

According to the present invention, the foregoing objects are attained by providing a programmable controller having a function for referring to a reference clock signal and updating the present value of a count in a user timer in response to inversion of the reference clock signal, comprising measuring means for measuring execution time of a user program from start of execution thereof in each one of cycle times, interrupt signal generating means for comparing the user program execution time measured with a minimum unit time represented by the reference clock signal and generating an interrupt signal if the user program execution time exceeds the minimum unit time of the reference clock signal, and updating means for updating the present value of the count in the user timer upon referring to the reference clock signal in response to generation of the interrupt signal.

In a preferred embodiment, the measuring means again starts measurement of the execution time of the user program from the beginning when the execution time of the user program exceeds the minimum unit time of the reference clock signal.

Thus, in accordance with the present invention, user program execution time is measured in each cycle time, and the interrupt signal is generated if the user program execution time exceeds the minimum unit time of the reference clock signal. When the interrupt signal is generated, the present value in the user timer is updated upon referring to the reference clock signal. Therefore, even if processing of the user program requires an extended period of time, a delay in the update processing of the user timer can be prevented. This makes it possible to raise the precision of the user timer.

In another aspect of the invention, the foregoing objects are attained by providing a programmable controller having a function for referring to a reference clock signal and updating the present value of a count in a user timer upon confirming inversion of the reference clock signal, comprising reference clock signal generating means for generating a plurality of reference clock signals equally displaced in phase from one another, selecting means for selecting one of the reference clock signals having an inversion timing nearest to a moment at which the user timer is started when the user timer is started, memory means for storing the reference clock signal selected, and updating means for updating the present value of the count in the user timer upon referring to the reference clock signal stored.

The reference clock signal generating means can be implemented by an oscillator circuit constructed of hardware.

In an embodiment of the present invention, the reference clock signal generating means includes a memory having a plurality of storage locations corresponding to the plurality of reference clock signals, and means for successively updating, at fixed times, data representing states of the reference clock signals stored at respective ones of the storage locations of the memory.

Thus, in accordance with this aspect of the present invention, a plurality of reference clock signals equally staggered from one another in terms of phase are generated. When the user timer is started, the reference clock signal having the inversion timing nearest the timer start timing is selected and stored. The present value in the user timer is subsequently updated upon referring to the stored reference clock signal. As a result, measurement error which might otherwise occur at the start of the user timer is eliminated, thus making it possible to realize an accurate user timer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1, 2 and 3 illustrate a first embodiment of a programmable controller according to the present invention, in which:

FIG. 1 is a block diagram showing the hardware configuration of the programmable controller;

FIG. 2 is a general flowchart showing the overall operation of the programmable controller; and FIG. 3 is a flowchart showing user timer update processing during execution of a user program;

FIGS. 4a, 4b and 5 illustrate a second embodiment of a programmable controller according to the present invention, in which:

FIGS. 4a and 4b are flowcharts showing user timer update processing during execution of a user program; and FIG. 5 is a time chart showing a user timer update processing operation;

FIGS. 6, 7, 8, 9, 10, 11, 12, and 13 illustrate a third embodiment of a programmable controller according to the present invention, in which:

FIG. 6 is a block diagram showing the hardware configuration of the programmable controller;

FIG. 7 is a timing chart showing a plurality of reference clock signals;

FIG. 8 is an explanatory view showing the configuration of a reference clock signal area;

FIG. 9 is an explanatory view showing the configuration of a user timer status area;

FIG. 10 is a flowchart showing processing for producing reference clock signals;

FIG. 11 is a flowchart showing operation when a user timer is started;

FIG. 12 is a flowchart showing processing for updating the present value in the user timer;

FIG. 13 is a function block diagram showing processing for updating the present value in the user timer; and FIGS. 14, 15, and 16 are time charts for describing the problems which arise in conventional update processing of a user timer.

DESCRIPTION OF THE PREFERRED EMBODIMENT

First Embodiment

Figure 1:
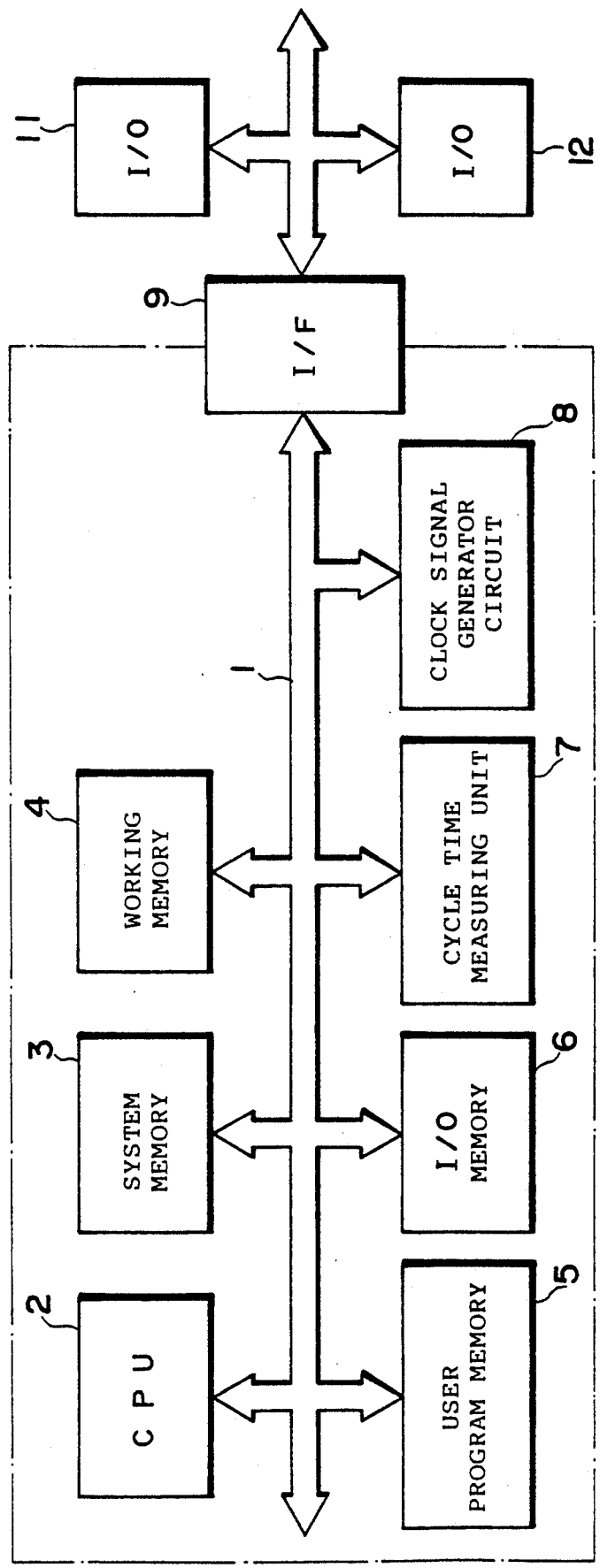

FIG. 1 is a block diagram showing the hardware configuration of a programmable controller to which the present invention is applied.

As is well known in the art, the programmable controller comprises a CPU 2, a system memory 3, a working memory 4, a user program memory 5, an I/O memory 6, a cycle time measuring unit 7, a clock signal generator circuit 8, and an interface circuit 9, these being interconnected by a bus 1. The programmable controller is connected to external input/output devices 11, 12 via the interface circuit 9. The clock signal generator circuit 8 outputs a reference clock signal for timer updating. The reference clock signal can be an electric signal but can also be realized by alternately writing "1" or "0" data in a prescribed area of memory whenever 100 ms elapses. The "1" or "0" data represents the state (H or L level) of the reference clock signal.

The programmable controller implements the various functions of a programmable controller utilizing the CPU 2 to execute a system program that has been stored in the system memory 3. In addition, the CPU 2 executes a user program stored in the user program memory 5, thereby controlling the input/output devices 11, 12 and other equipment (not shown) in accordance with the user program.

Figure 2:
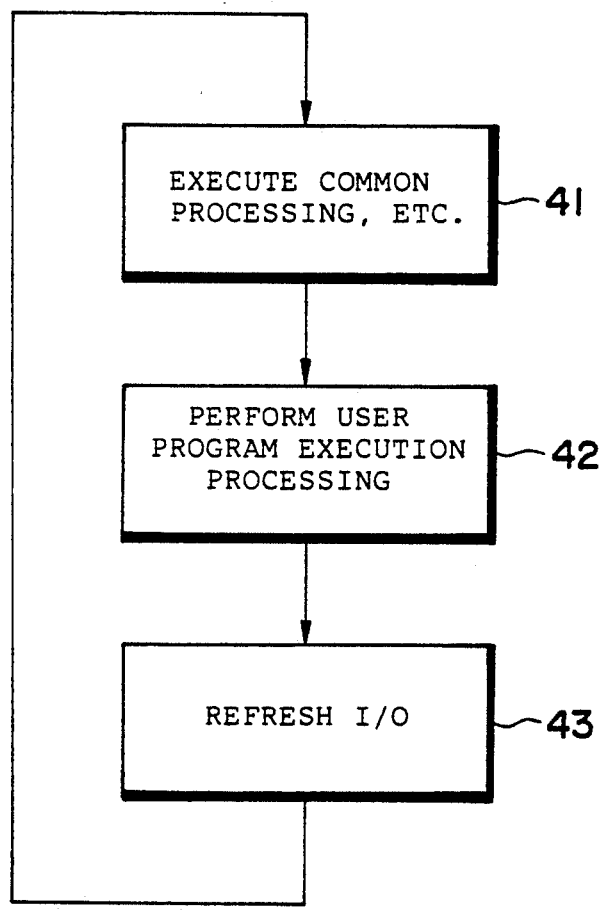

FIG. 2 is a general flowchart representing the general features of programmable controller operation.

As shown in FIG. 2, steps of common processing, user program execution processing and I/O refresh processing are executed cyclically. The time needed for one cycle of these processing steps is referred to as cycle time (CT).

Figure 3:
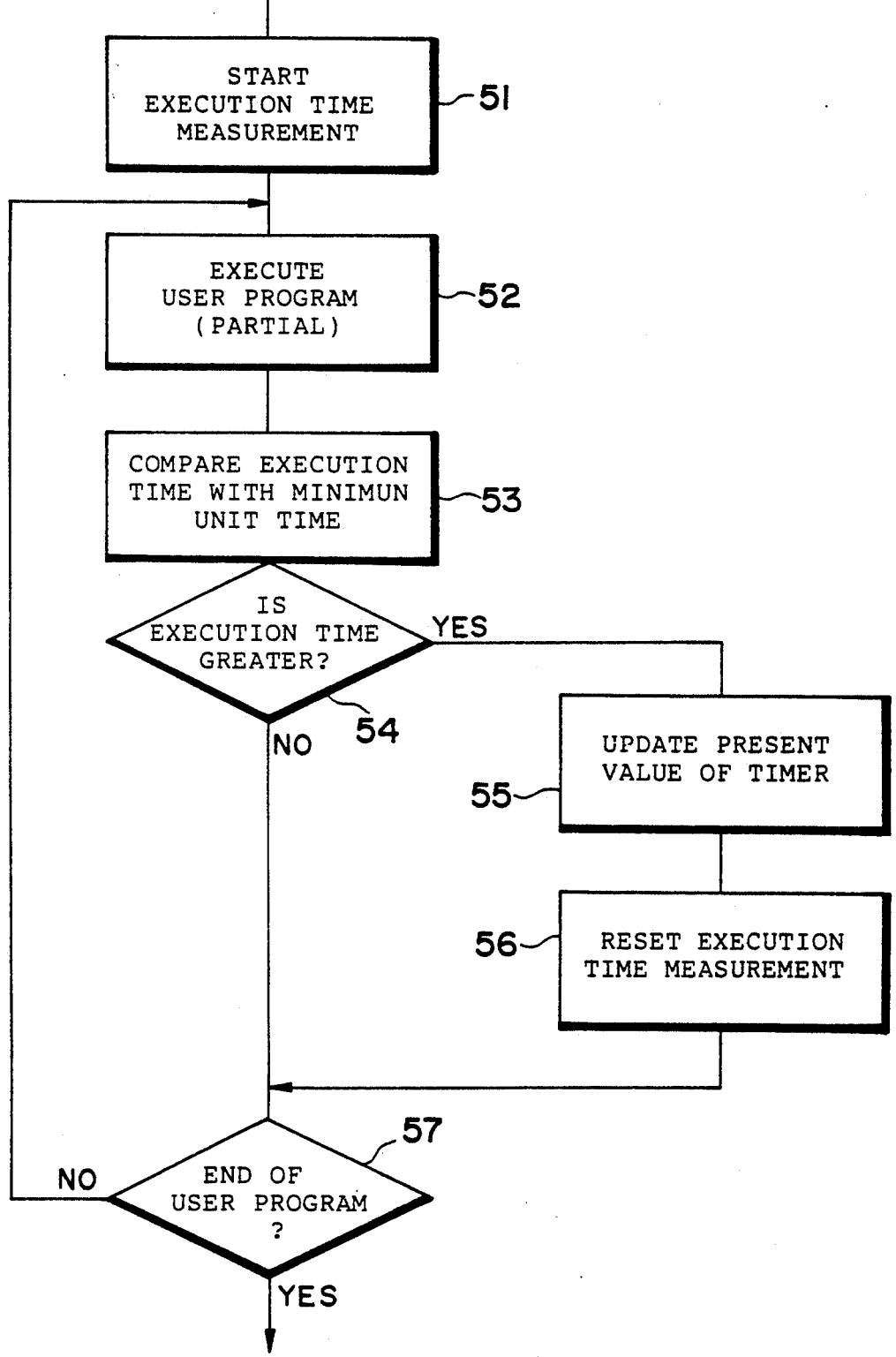

FIG. 3 illustrates a portion of user program execution processing (step 42 in FIG. 2), particularly a portion relating to timer update processing.

First, at step 51 in FIG. 3, execution of the user program is started and so is measurement of execution time. Measurement of execution time can be performed by the cycle time measuring unit 7, by a timekeeping circuit composed of hardware, or by a software program.

Following the end of execution of a predetermined amount (e.g, 100 steps) of the user program at step 52, it is determined at step 53 whether the measured value of execution time is greater than a minimum unit time (100 ms) represented by the reference clock signal generated by the reference clock signal generator circuit 8. The amount of the program executed at step 52 is sufficiently small in comparison with the abovementioned minimum unit time. If the measured value of execution time does not exceed the minimum unit time (100 ms) (NO at step 54), then steps 52 through 54 are repeated until the user program ends at step 57.

If the measured value of execution time does exceed the minimum unit time (100 ms) (YES at step 54), then the present value in the user timer already started by the user program is updated by interrupt processing at step 55. Thereafter, the measured value of execution time is reset at step 56, after which user program execution processing and monitoring of execution time are continued (steps 52 through 56). When the measured value of execution time has been reset at step 56, the clocking of execution time begins again from zero. The foregoing processing is continued until the user program ends.

When the user program ends, processing proceeds from step 42 of FIG. 2 to the I/O refresh processing of step 43, and thence to user program execution processing (step 42 and the processing shown in FIG. 3) via the common processing of step 41.

In the common processing (step 41 in FIG. 2) that follows user program execution processing, it goes without saying that processing for updating the user timer by referring to the reference clock signal is carried out in the same manner as in the prior art.

More specifically, the present invention supplements the user timer update processing of 1) and 2) mentioned earlier. When processing for executing the user program is lengthy and the time required exceeds the abovementioned minimum unit time (100 ms), the updating of the user timer is not performed correctly with the methods of 1) and 2). In accordance with the present invention, when the minimum unit time elapses during execution of the user program, the user timer is updated upon the elapse of the minimum unit time. This makes it possible to update the user timer correctly at all times. Moreover, though execution of the user program is halted temporarily whenever a predetermined number of the user program steps are executed, what is performed at such time is solely comparison processing (step 53), so there is almost no decline in overall processing capability. If the user program ends without elapse of the minimum unit time, processing for updating the user timer is not carried out. (Of course, user timer update processing is performed in common processing, etc.) As a result, wasting of time due to needless interrupt processing (user timer update processing, inclusive of reference to the reference clock signal) is prevented.

It is permissible for the time to be compared with the measured execution time at step 53 to be slightly shorter than the minimum unit time mentioned above.

Second Embodiment

Figure 4A:
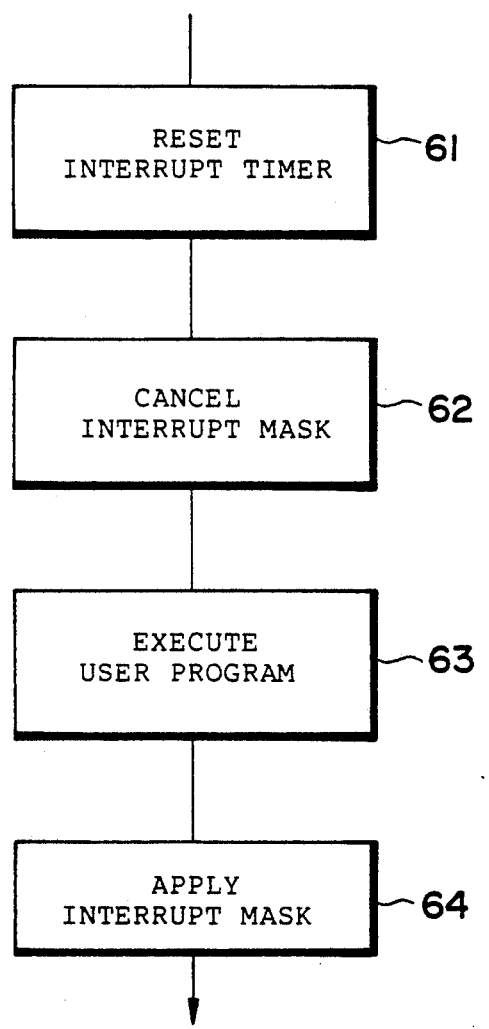
Figure 4B:
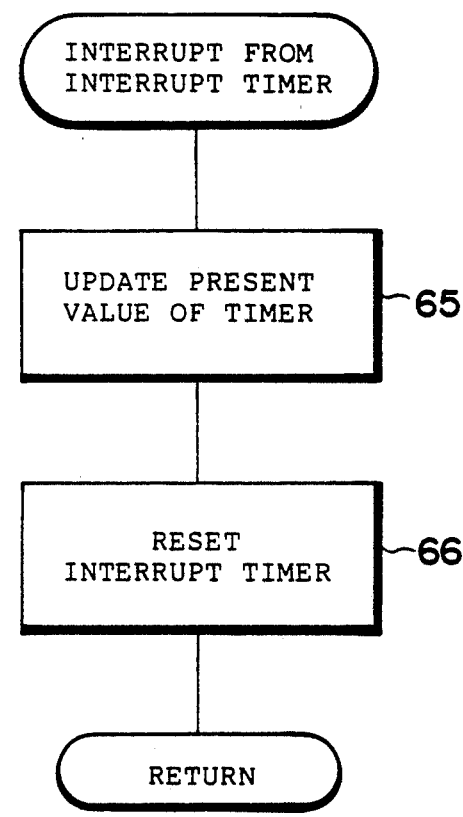

FIGS. 4a and 4b illustrate a second embodiment of the invention. The hardware configuration of FIG. 1 and the general flowchart shown in FIG. 2 apply also to this embodiment just as they are.

An interrupt timer is used in this embodiment. A time period equal to or slightly shorter than the aforementioned minimum unit time is set. The interrupt timer can be realized by a hardware circuit or by a software program.

FIG. 4a shows a portion of the contents of user program execution processing indicated at step 42 in FIG. 2.

The interrupt timer is reset at step 61 in FIG. 4a before the substantial start of user program execution. As a result, the interrupt timer starts its timekeeping operation, after which an interrupt mask is cancelled at step 62. Following the foregoing preparations, processing proceeds to execution of the user program at step 63. If the user program ends without entry of an interrupt the interrupt timer, the interrupt mask is applied at step 64 and user program execution processing (step 42 in FIG. 2) is ended.

When the interrupt timer applies an interrupt during execution of the user program, a transition is made to the interrupt processing shown in FIG. 4b. When the interrupt timer applies the interrupt in FIG. 4b, user timer update processing is executed at step 65. If necessary, inversion of the reference clock signal is confirmed at this time. The interrupt timer is then reset at step 66 to return to execution of the user program. When the interrupt timer has been reset, clocking of a set time is started again from the beginning.

In this embodiment also, it goes without saying the next user timer update processing that references the reference clock signal is performed in the common processing (step 41 of FIG. 2).

By thus performing the operations described above, user timer updating does not fail to be carried out even if execution of the user program takes an extended period of time.

In the foregoing embodiment, the set time of the interrupt timer is designed to be equal to or slightly less than the minimum unit time. It is permissible for the set time of the interrupt timer to be made half or less than half (e.g., ¼, 1/5, 1/10, etc.) of the minimum unit time. In this case, when an interrupt is applied by the interrupt timer, reference is had to the reference clock signal and a check is performed to see if the state of the signal differs from the immediately preceding state (the H or L level) of the signal. If the present state differs the immediately preceding state, then the value of the count (the present value) in the user timer is updated.

Figure 5:
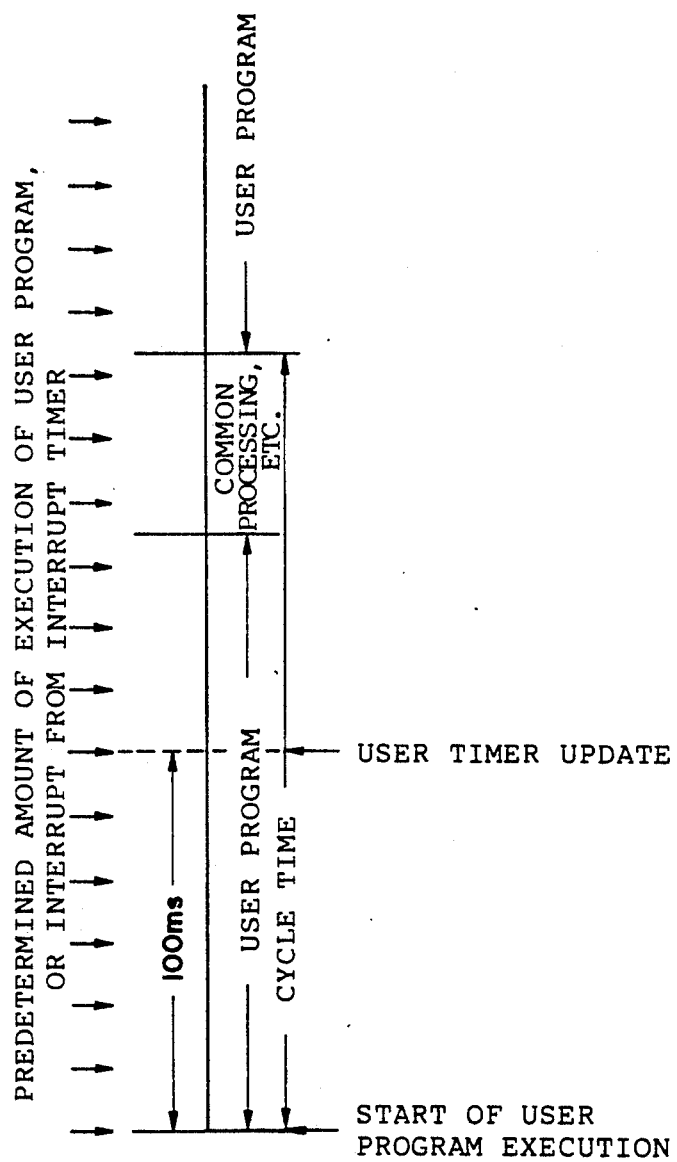

FIG. 5 shows the operation performed in the first and second embodiments described above (for a case where the set time of the interrupt timer is made a fraction of the minimum unit time). When the minimum unit time has elapsed from the moment the user program execution starts, updating of the user timer is performed. The arrangement is such that the user timer is updated before the reference clock signal changes state.

By virtue of the foregoing operation, the above-described embodiments have the following advantages:

The present value in the user timer is no longer disturbed if there is a fluctuation in the timing interval for updating the user timer. In addition, any error in the present value can be diminished even if the minimum measurement time of the reference clock signal is not made less than the minimum unit time of the user timer. Furthermore, since the user timer will be updated through the ordinary execution procedure at times other than when user program execution time is greater than the minimum unit time of the reference clock signal, usually there is almost no overhead time.

Third Embodiment

Figure 6:
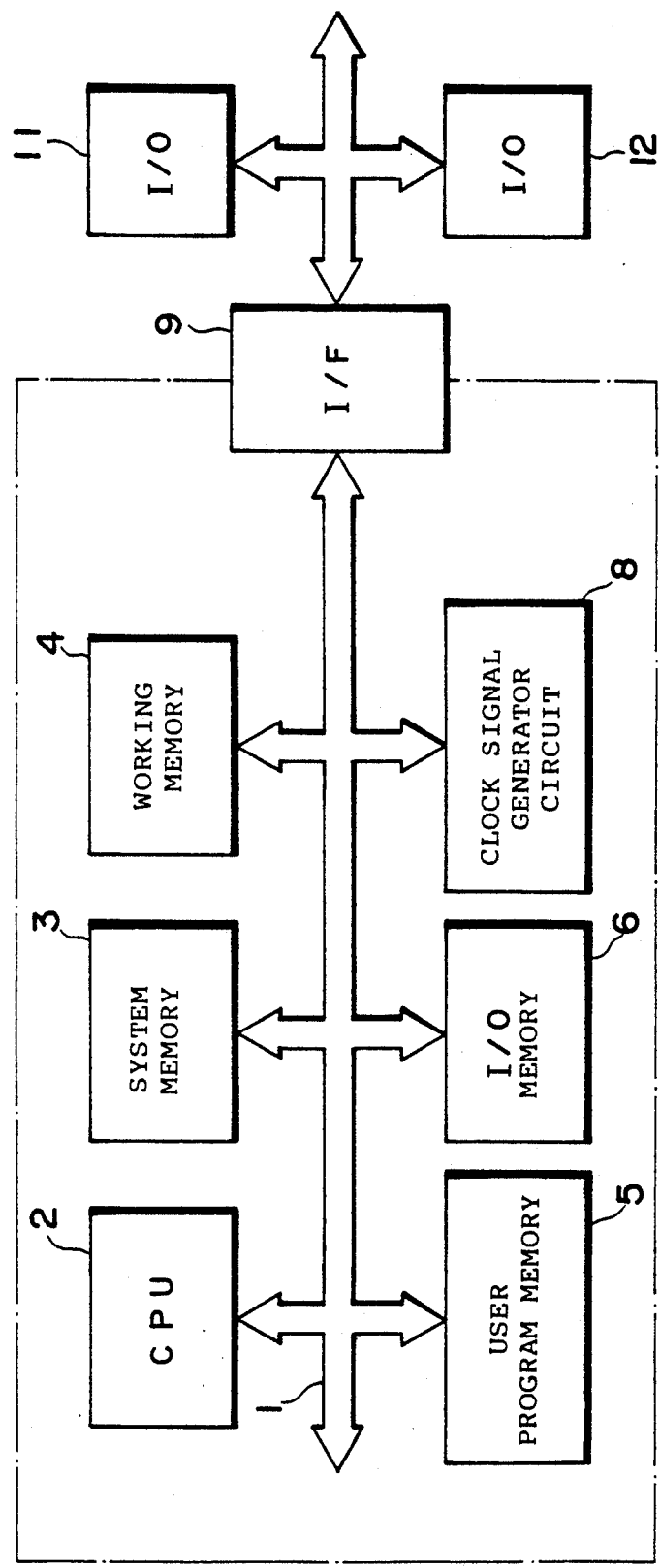

FIG. 6 illustrates the construction of a programmable controller according to a third embodiment of the invention. The arrangement of FIG. 6 is the same as that of FIG. 1 except for the fact that the cycle time measuring unit is not shown.

Figure 7:
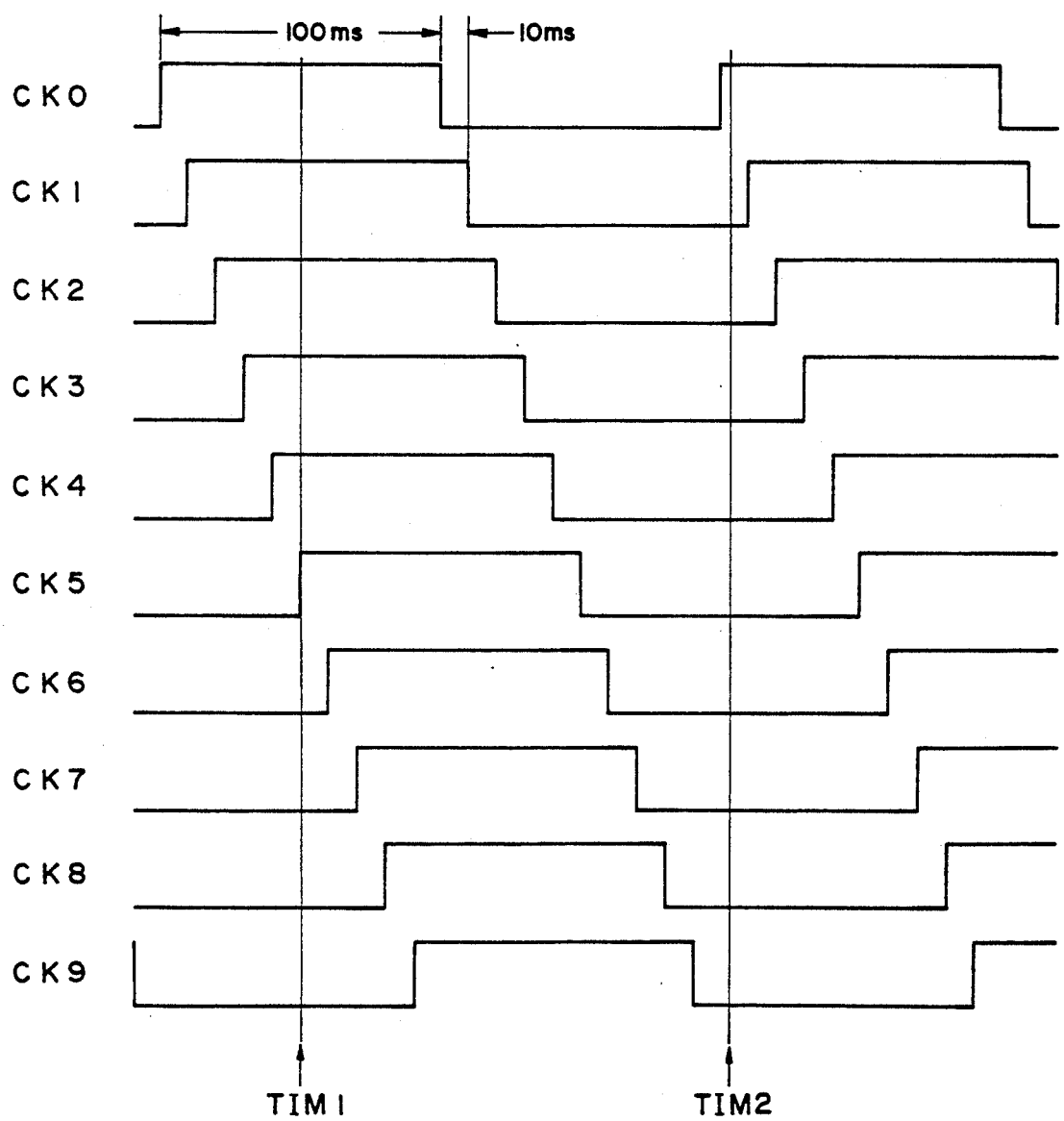

The clock signal generator circuit 8 illustrated in FIG. 6 generates a plurality of types (ten in this embodiment) of reference clock signals, as shown in FIG. 7. These reference clock signals are designated CK0, CK1, CK2, ..., CK9. The reference clock signals all repeatedly alternate between the H and L levels every minimum unit time (100 ms) and are staggered in phase by 10 ms from one to the next, as shown in FIG. 7. These reference clock signals are not limited to electric signals but can also be realized by writing "1" or "0" in an area of memory every 100 ms to express the signal state (the H or L level), as set forth earlier.

When a user timer has been started (when the initial timer instruction for a certain user timer has been executed), one of the aforementioned plurality of reference clock signals is selected. When a user timer (timer instruction) TIM1 has been started, the reference clock signal CK5 in FIG. 7 is selected. When another user timer (timer instruction) TIM2 has been started, the reference clock signal CK0 is selected. Thus, when a user timer has been started, the reference clock signal whose state changes (inverts) nearest to this starting time just prior thereto is selected and set. From this time onward, processing for updating this user timer is executed upon referring to the state of the reference clock signal that has been selected. Thus, even though the minimum unit time of the reference clock signal is 100 ms, preparing ten of these reference clock signals successively displaced in phase by 10 ms is equivalent to providing a reference clock whose minimum unit time has been made 10 ms.

Figure 8:
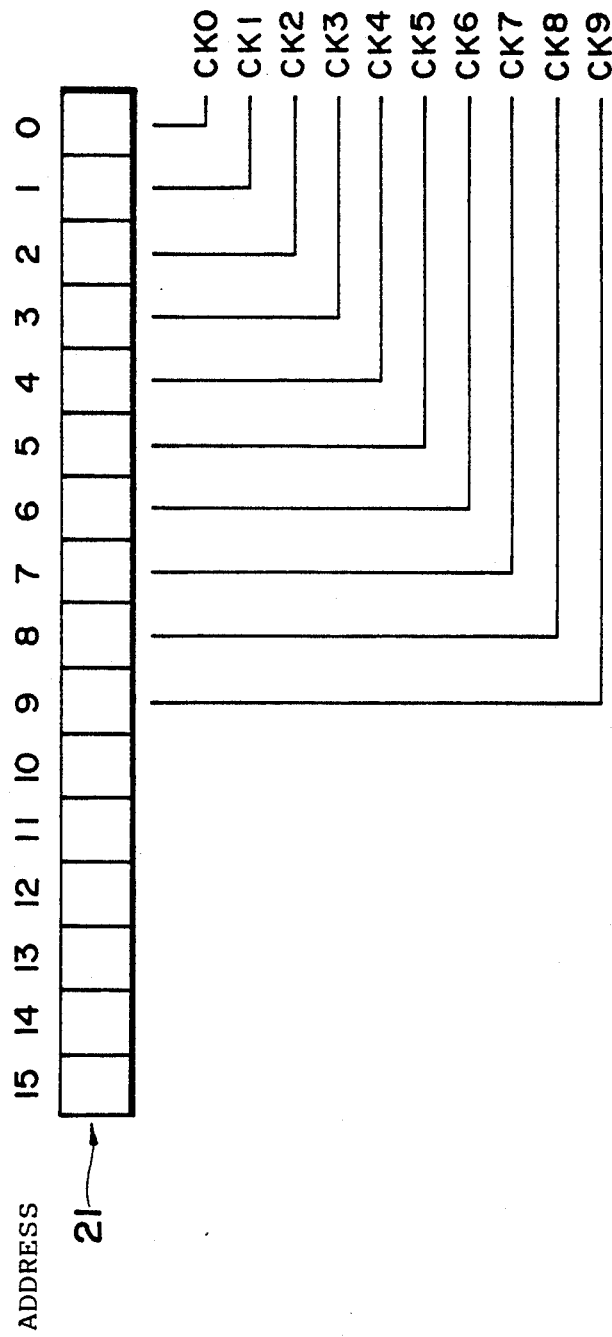

FIG. 8 is an explanatory view showing the constitution of a reference clock signal area 21 set in the working memory 4. In the reference clock signal area 21, one bit of storage location is assigned to each of the reference clock signals CK0 through CK9 from the lower order addresses. Data "1" or "0" is written in each of these storage locations. These data undergo a change in state from "1" to "0" or "0" to "1" at the timing shown in FIG. 7, thereby expressing the function of the reference clock signal. The data "1" corresponds to the H level of the reference clock signal, and the data "0" corresponds to the L level thereof.

Figure 9:
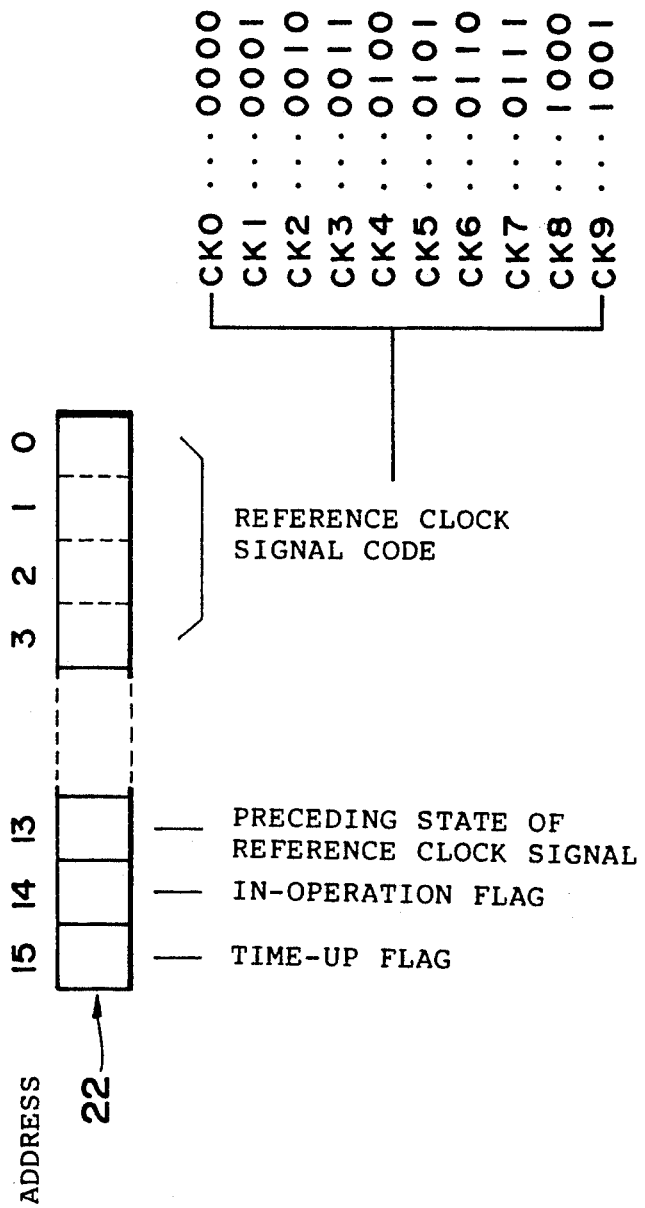

FIG. 9 is an explanatory view showing the configuration of a user timer status area 22 set in the working memory 4. The status area 22 is provided for each user timer (timer instruction). A code representing the reference clock signal selected when the user timer (timer instruction) is started is stored in the four lower order bits of each timer status area at the addresses thereof.

The immediately preceding state of the pertinent reference clock signal is stored at the 13th bit. The 14th bit is used as an in-operation flag indicating the fact that the user timer is in the process of operating. This flag is turned on (set) while the user timer is in operation. The 15th bit is used as a time-up flag representing the fact that the set time has elapsed from start of the timer.

The addresses of the reference clock signal area 21 shown in FIG. 8 and the addresses of the user timer status area 22 shown in FIG. 9 are both 0 through 15. However, these correspond to the lower order bits of the actual address. Since the higher order bits of these addresses differ, no problems are encountered.

The general flowchart illustrating the overall operation of the programmable controller shown in FIG. 2 applies also to this embodiment.

Figure 10:
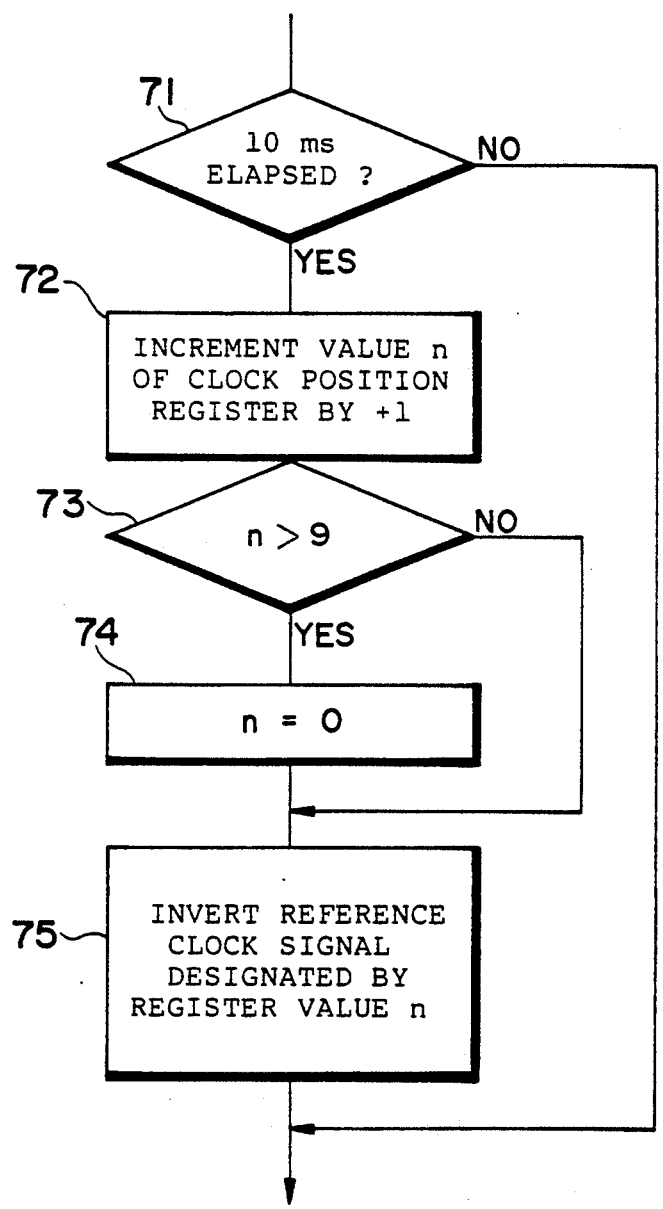

FIG. 10 is a flowchart showing a procedure for producing the reference clock signals.

Whenever 10 ms of time elapses at step 71 in FIG. 10, a value n that has been stored in a separately provided clock position register (not shown) is incremented by +1 at step 72. If the value n in the clock position register exceeds 9 at step 73, the register is cleared to 0 at step 74. Thus, the value n in the register is successively updated from 0 to 1, 1 to 2, 2 to 3 and so up to 9, and then returns to 0, whenever 10 ms of time elapses. Further, whenever the value n in the clock position register is updated, there is a change (from "0" to "1" or "1" to "0") in the 1-bit data, which represents the state of the reference clock signal at the storage location in the reference clock signal area 21 whose address is designated by the value in the register. This change is performed at step 75. For example, if the value n stored in the clock position register is 4, the reference clock signal CK4 changes state.

The reference clock signals CK0 through CK9 whose states change as shown in FIG. 7 are obtained by processing in accordance with the flowchart illustrated in FIG. 10.

Figure 11:
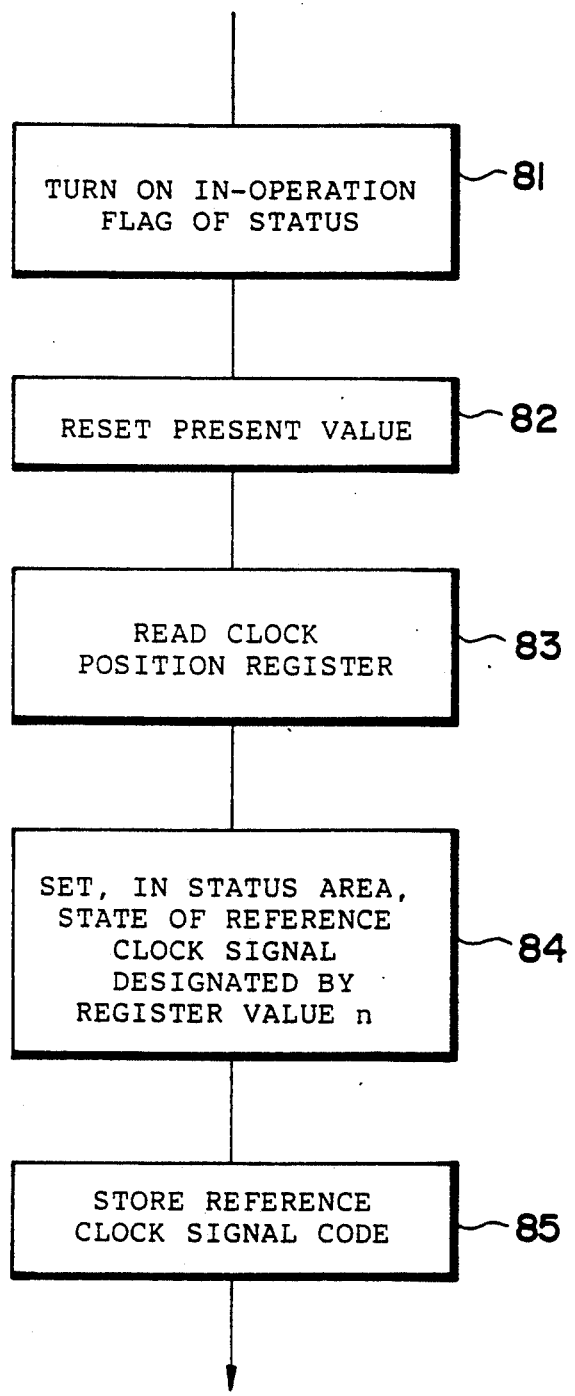

FIG. 11 is a flowchart illustrating a processing procedure for starting the user timer.

The in-operation flag in the status area corresponding to the user timer (timer instruction) designated within the user program is turned on (set) at step 81. Next, at step 82, the present value in the pertinent timer (which value is stored in the predetermined area of memory, as set forth above) is reset to 0 (or a preset value corresponding to time set in a timer is preset). This is followed by step 83, at which the value n stored in the clock position register described above is read. Next, at step 84, the state (data "0" or "1") of the reference clock signal in the storage location of the reference clock signal area 21 addressed by the value n is read and this is written, as the immediately preceding state of the signal, at the storage location of the 13th bit in status area 22. The code of the reference clock signal represented by the value n read out of the register is stored at the storage locations of the four lower order bits of status area 22 at step 85.

In this processing for updating the present value in the pertinent user timer, reference is had to the reference clock signal code and the state of the immediately preceding reference clock signal stored in the status area 22.

Figure 12:
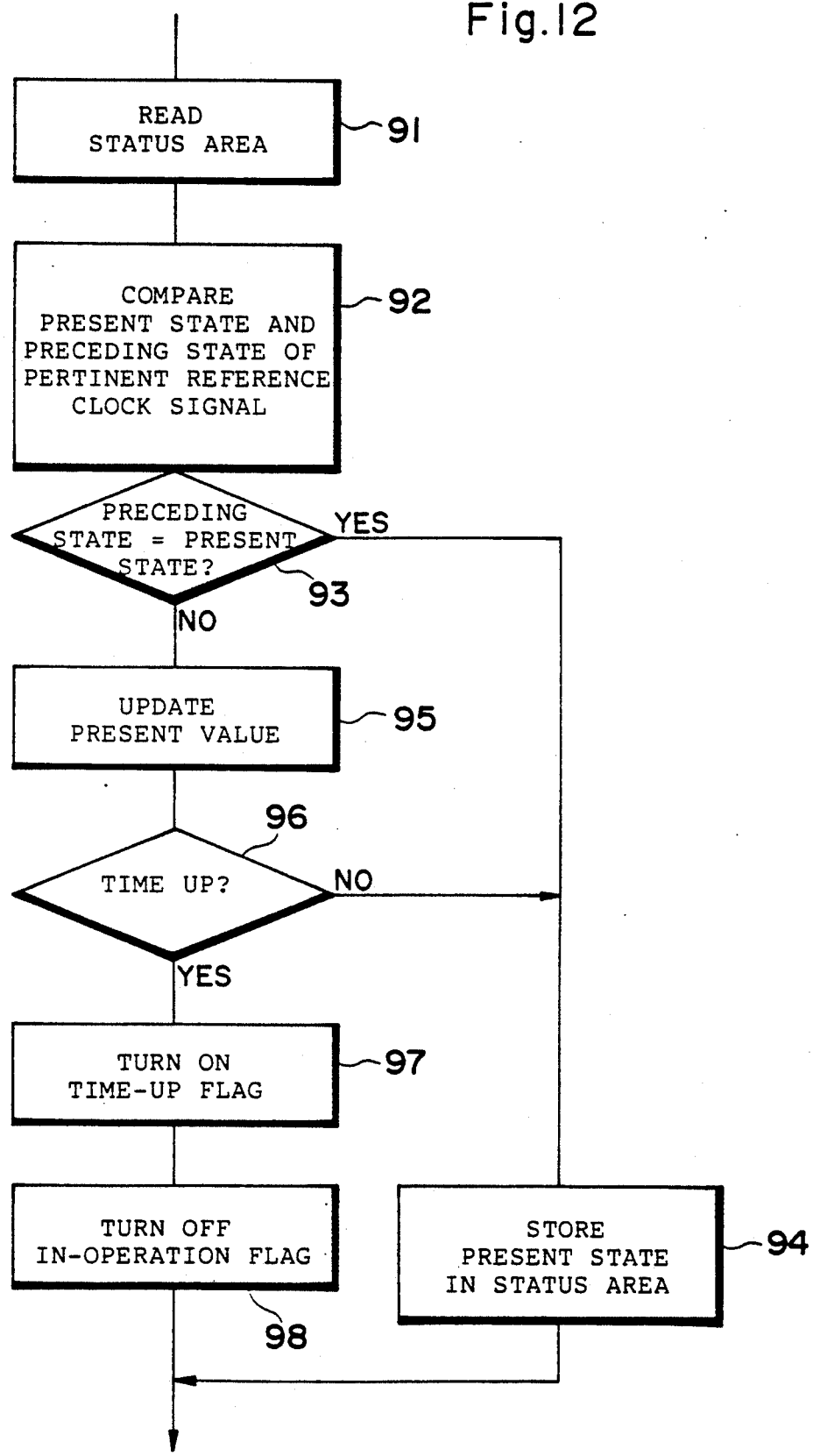

FIG. 12 is a flowchart illustrating the procedure of processing for updating the present value in the user timer. This processing is executed at the timing described in connection with the first and second embodiments or in the conmon processing of step 41 in FIG. 2.

First, at step 91 in FIG. 12, the data stored in the status area 22 of the pertinent user timer is read. From among this data, the state of the reference clock signal designated by the reference clock signal code is read out of the reference clock signal area 21. This is the present state of the reference clock signal. This presently prevailing state is compared with the immediately preceding state of the signal, stored at the 13th bit of the status area 22, at step 92. If the two compared states agree (YES at step 93), then the state of the reference clock signal read from the reference clock signal area 21 is stored at the 13th bit of status area 22 as the immediately preceding state at step 94. Since the immediately preceding state and the present state are the same, in this case there is no change in the data at the 13th bit of status area 22.

If the two compared state do not agree (NO at step 93), then the present value in the user timer is updated at step 95. Next, based on the updated present value, it is determined at step 96 whether time is up. If the time is not up (NO at step 96), the state of the reference clock signal read out of the reference clock signal area is stored as the immediately preceding state at the 13th bit of status area 22 at step 94. If time is up (YES at step 96), namely if the present value of the user timer has attained a value corresponding to the set time, or if it has become zero, then a time-up flag is turned on (set) at step 97 and the in-operation flag is turned off (reset) at step 98.

Figure 13:
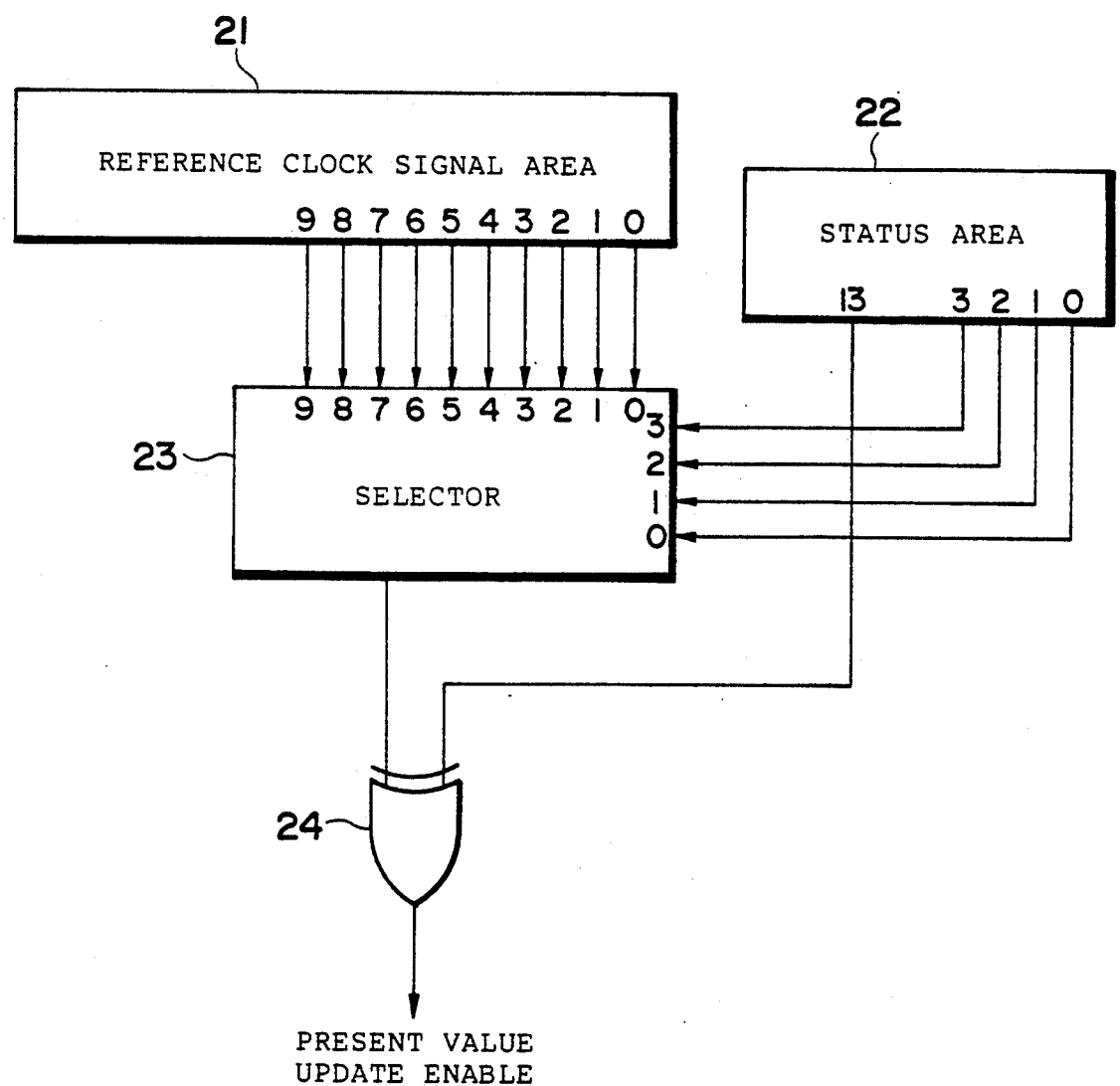
Figure 14:
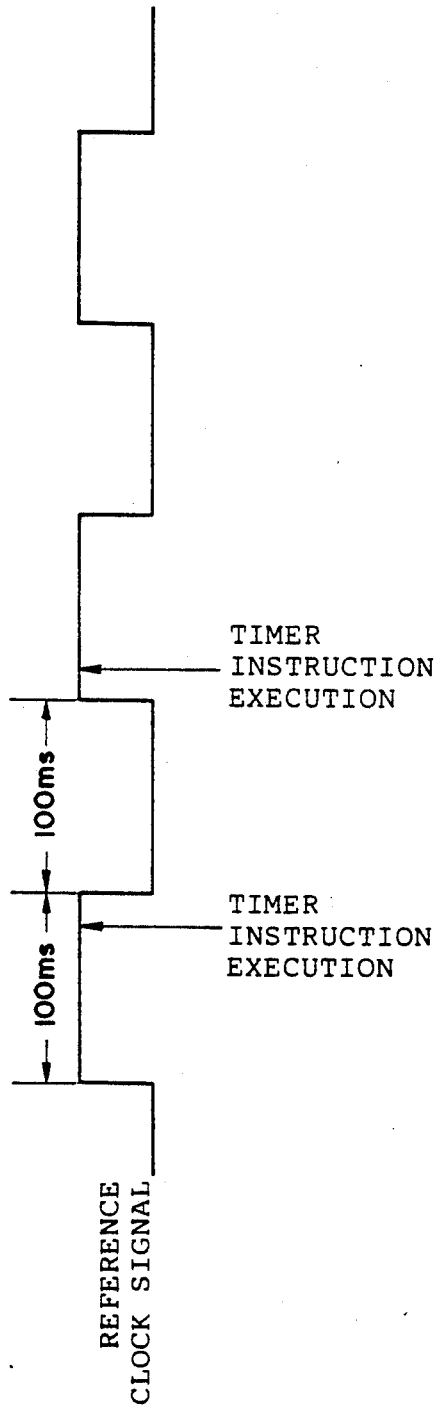
Figure 15:
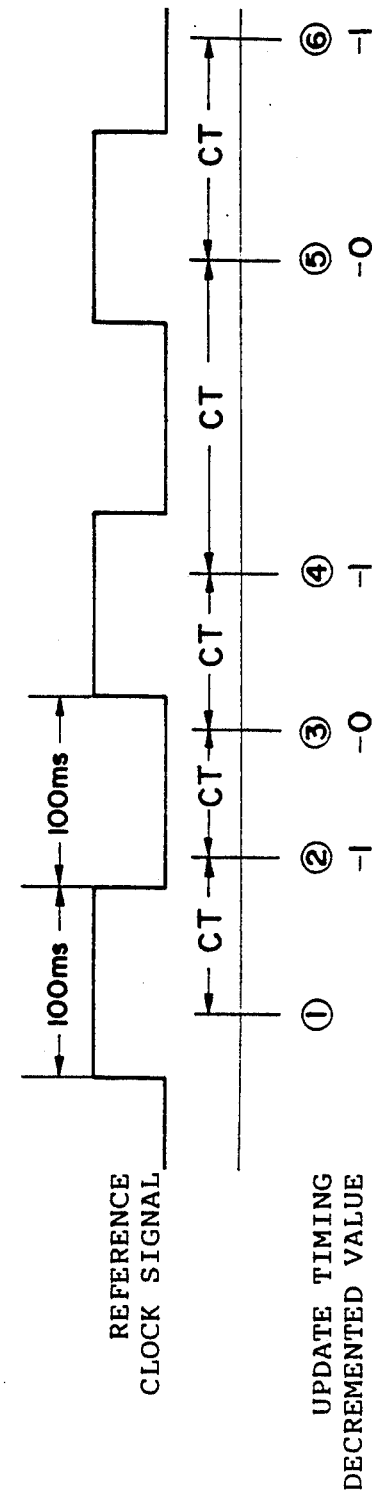

FIG. 13 is a function block diagram for executing the processing of step 92 in FIG. 12.

As shown in FIG. 13, each output from the reference clock signal area 21 enters a selector 23. From among these signals, only one selected by the reference clock signal code that has been set in the status area 22 is inputted to an exclusive-OR gate 24. Meanwhile, the value representing the immediately preceding state of the reference clock signal stored at the 13th bit of status area 22 is applied to the other input terminal of the exclusive-OR gate 24. An enable signal which causes the present value to be updated is outputted only when the two inputs to the gate 24 do not agree.

Thus, the timer instruction (user timer) in the user program is executed by the operations illustrated in FIGS. 11 and 12. As a result, it is possible to minimize any measurement error which occurs at starting of the timer, and any measurement error at this time diminishes in inverse proportion to the number of reference clock signals set. Since ten reference clock signals are used in this embodiment, measurement error can be reduced to 10 ms, which is one-tenth of the minimum unit time of 100 ms.

It goes without saying that in a case where a plurality of timer instructions are present in a user program, the reference clock signal nearest to the timing at which the change in state occurs is selected for each and every instruction.

Furthermore, though the present embodiment is so adapted that a reference clock signal whose state changes immediately before start of the user timer is selected, the same effects can be obtained even if the reference clock signal selected is one whose state changes immediately after the start of the user timer.

As many apparently widely different embodiments of the present invention can be made without departing from the spirit and scope thereof, it is to be understood that the invention is not limited to the specific embodiments thereof except as defined in the appended claims.

What is claimed is:

1. A programmable controller for updating the present value of a count in a user timer in response to a reference clock signal, comprising:
    measuring means for measuring an execution time of a user program from a start of execution thereof within each of a plurality of cycle times;
    interrupt signal generating means for comparing the measured user program execution time with a minimum unit time represented by the reference clock signal and generating an interrupt signal if the measured user program execution time exceeds the minimum unit time; and
    updating means for updating the present value of the count in the user timer in response to the reference clock signal and generation of the interrupt signal.

2. The programmable controller according to claim 1, wherein said measuring means restarts measurement of the user program execution time when the user program execution time exceeds the minimum unit time of the reference clock signal.

3. The programmable controller according to claim 1, wherein said interrupt signal generating means comprises means for comparing the user program execution time with the minimum unit time whenever a predetermined number of steps of the user program are executed.

4. The programmable controller according to claim 1, wherein said interrupt signal generating means comprises an interrupt timer that outputs said interrupt signal when said interrupt timer counts to a value substantially equal to the minimum unit time.

5. The programmable controller according to claim 1, wherein said interrupt signal generating means comprises an interrupt timer that outputs said interrupt signal when said interrupt timer counts to a value shorter than the minimum unit time, said interrupt signal generating means comparing the user program execution time with the minimum unit time in response to said interrupt signal from said interrupt timer.

6. The programmable controller according to claim 1, further comprising:
    means for generating a plurality of reference clock signals equally displaced in phase from one another;
    means for selecting one of the reference clock signals from among the plurality thereof having an inversion timing nearest to a moment at which the user timer is started;
    means for storing a state of the reference clock signal selected;
    means for successively updating, at fixed times, the state of the selected reference clock signal stored in said storing means; and
    means for updating the present value of the count in the user counter in response to the stored state of the reference clock signal when the stored state of the selected reference clock signal has changed.

7. A programmable controller for updating the present value of a count in a user timer in response to a reference clock signal, comprising:
    generating means for generating a plurality of reference clock signals equally displaced in phase from one another;
    selecting means for selecting one of the reference clock signals from among the plurality of thereof having an inversion timing nearest to a moment at which the user timer is started;

memory means for storing a state of the selected reference clock signal;

means for successively updating, at fixed times, the state of the selected reference clock signal stored in said memory means; and updating means for updating the present value of the count in the user timer in response to the stored state of the reference clock signal when the stored state of the selected reference clock signal has changed.

8. The programmable controller according to claim 7, wherein said reference clock signal generating means includes:

a memory having a plurlaity of storage locations corresponding to the plurality of reference clock signals for storing the states; and means for successively updating, at fixed times, said states of the reference clock signals stored at respective ones of the storage locations of said memory.

* * * * *